(12) United States Patent
Vorreiter

(10) Patent No.: US 9,365,196 B2
(45) Date of Patent: Jun. 14, 2016

(54) METHOD FOR OPERATING A WHEEL SLIP CONTROL APPARATUS WITH COMPENSATED WHEEL SPEEDS

(71) Applicant: Martin Vorreiter, Vaihingen (DE)

(72) Inventor: Martin Vorreiter, Vaihingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/409,923

(22) PCT Filed: Jun. 19, 2013

(86) PCT No.: PCT/EP2013/062740
§ 371 (c)(1),
(2) Date: Dec. 19, 2014

(87) PCT Pub. No.: WO2013/189982
PCT Pub. Date: Dec. 27, 2013

(65) Prior Publication Data
US 2015/0191158 A1 Jul. 9, 2015

(30) Foreign Application Priority Data

Jun. 22, 2012 (DE) .......................... 10 2012 012 475

(51) Int. Cl.
*B60T 8/24* (2006.01)
*B60T 8/171* (2006.01)
(Continued)

(52) U.S. Cl.
CPC ................. *B60T 8/171* (2013.01); *B60T 8/172* (2013.01); *B60T 8/175* (2013.01); *B60T 8/17551* (2013.01);
(Continued)

(58) Field of Classification Search
CPC .......... Y10T 477/10; B60W 2510/207; B60W 2230/02; B60T 8/17552; B60T 8/171; B60T 8/175; B60T 8/17551; G05D 13/66; G05D 15/00

USPC .................... 701/69, 70, 71, 72, 74; 340/444; 303/140, 146; 475/19

See application file for complete search history.

(56) References Cited

U.S. PATENT DOCUMENTS 5,519,615 A 5/1996 Schob et al.
5,691,900 A 11/1997 Luckevich et al.
(Continued)

FOREIGN PATENT DOCUMENTS

DE 42 01 675 7/1994
DE 195 22 634 1/1997
(Continued)

OTHER PUBLICATIONS

European Patent Office, International Preliminary Report on Patentability dated Dec. 23, 2014, from International Patent Application No. PCT/EP2013/062740, filed on Jun. 19, 2013.
English Translation of European Patent Office, International Preliminary Report on Patentability dated Dec. 23, 2014, from International Patent Application No. PCT/EP2013/062740, filed on Jun. 19, 2013.

*Primary Examiner* — Gertrude Arthur Jeanglaude
(74) *Attorney, Agent, or Firm* — Kenyon & Kenyon LLP

(57) ABSTRACT

A method and device for operating a wheel slip control apparatus, including determining wheel speeds of wheels compensated with respect to wheel speed differences during a turn as input variables for the wheel slip control apparatus, with which a) a neutral steering, understeering or oversteering driving condition of the vehicle is determined from the driving behavior during a turn, b) depending on the determined condition of the vehicle, either the reference or actual yaw rate is used to calculate a turn radius related to a selected point on the vehicle, c) wheel-related turn radii for at least some wheels are determined from the turn radius related to the selected point, d) reference factors are determined from the wheel-related turn radii and a common reference turn radius for at least some wheels, and e) the compensated wheel speeds are each determined from the reference factors and measured wheel speeds for at least some wheels, and f) the compensated wheel speeds are used as input variables for a wheel slip control apparatus.

13 Claims, 1 Drawing Sheet

(51) Int. Cl.
   *B60T 8/172* (2006.01)
   *B60T 8/1755* (2006.01)
   *B60T 8/1761* (2006.01)
   *B60T 8/175* (2006.01)
   *G05D 13/66* (2006.01)
   *G05D 15/00* (2006.01)

(52) U.S. Cl.
   CPC ............ *B60T 8/17616* (2013.01); *G05D 13/66* (2013.01); *G05D 15/00* (2013.01); *B60T 8/17552* (2013.01); *B60T 2201/16* (2013.01); *B60T 2210/24* (2013.01); *B60T 2230/02* (2013.01); *B60W 2510/207* (2013.01); *Y10T 477/10* (2015.01)

(56) References Cited

U.S. PATENT DOCUMENTS

| | | | |
|---|---|---|---|
| 5,749,062 | A | 5/1998 | Yamamoto et al. |
| 5,931,887 | A * | 8/1999 | Hac ................................ 701/71 |
| 6,033,337 | A * | 3/2000 | Ohkuma et al. .................. 477/1 |
| 7,997,373 | B2 * | 8/2011 | Yasui et al. .................. 180/197 |

FOREIGN PATENT DOCUMENTS

| | | |
|---|---|---|
| DE | 196 52 553 | 7/1997 |
| EP | 0 508 146 | 10/1992 |
| EP | 1 544 760 | 6/2005 |

* cited by examiner

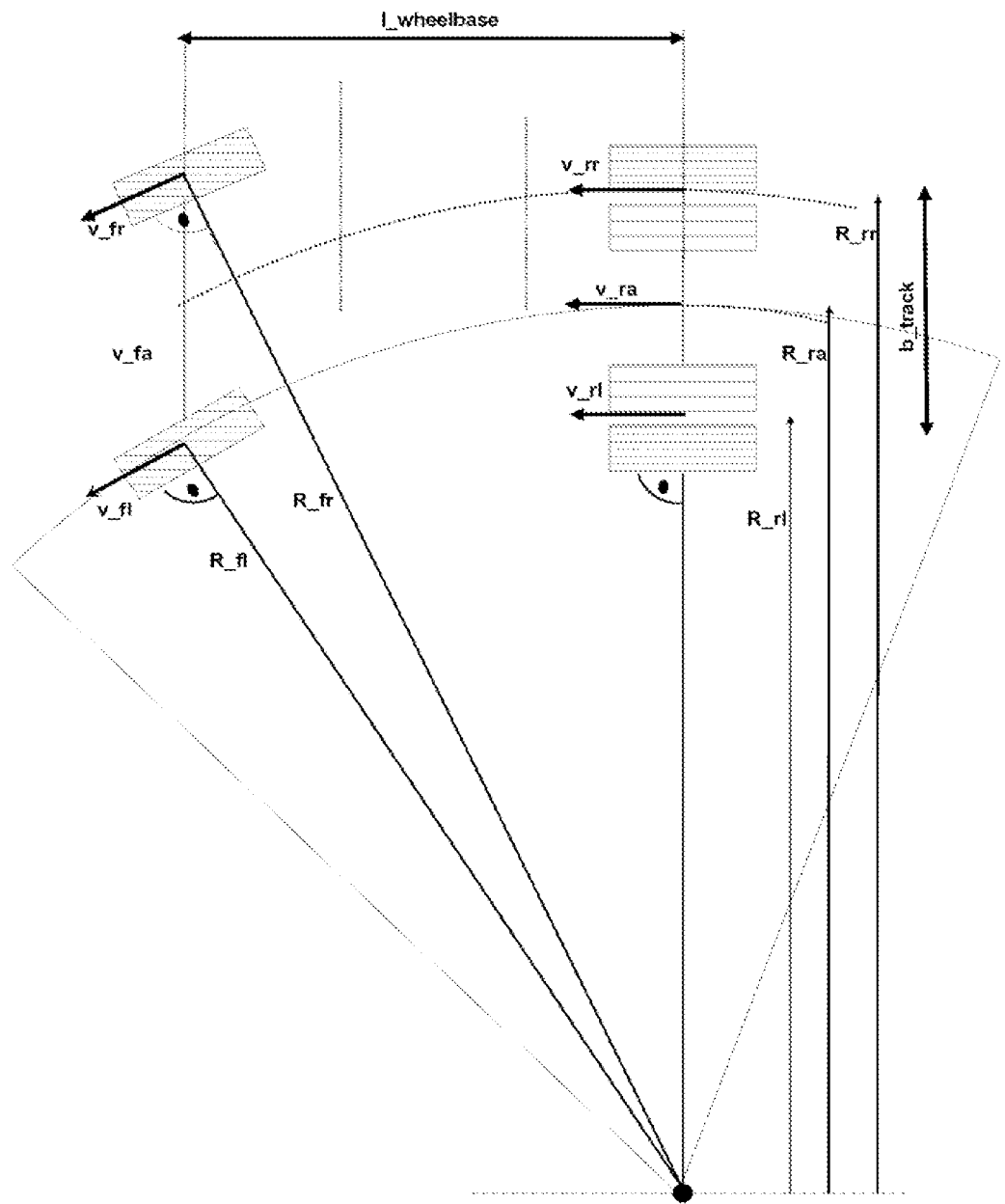

METHOD FOR OPERATING A WHEEL SLIP CONTROL APPARATUS WITH COMPENSATED WHEEL SPEEDS

FIELD OF THE INVENTION

The present invention relates to a method for operating a wheel slip control apparatus of a vehicle, including the determination of wheel speeds of wheels of the vehicle compensated in relation to wheel speed differences when turning as input variables for the wheel slip control apparatus, and of a wheel slip control apparatus operated according to such a method. Furthermore, the present invention also relates to a vehicle dynamics control device including such a wheel slip control apparatus.

BACKGROUND INFORMATION

The aim of wheel slip control such as ABS (Anti-lock Braking System) or TCS (Traction Control System) is to control or limit braking slip or drive slip occurring on wheels to an optimal slip. An optimal braking slip amounts to e.g. 12%. The wheel slip is determined by comparing the wheel speed of the wheel involved with a central reference speed. The measured wheel slip also contains, apart from the components longitudinal slip and braking slip or drive slip, which should be controlled within the scope of ABS or TCS, a component that arises when traversing a turn, as the wheels on the outside of the turn rotate faster than the wheels on the inside of the turn. Said turn slip component consists of the difference in revolution rates between the wheels when turning and depends on the position of the wheels on the vehicle (front/rear; left/right), on the turn radius, on the geometry of the vehicle and on the speed of the vehicle. Because of the information originating exclusively from the wheel revolution rate sensors, the ABS or the TCS does not "know" in such cases whether the measured difference in revolution rates between the wheels is caused by different coefficients of friction (μ-split) of the wheels or by turning.

In order to compensate the difference in revolution rates between the wheels in a turn during braking slip control (ABS), according to the prior art, the difference in revolution rates between the wheels prior to braking is observed and is taken into account when determining the braking slip in braking situations. Such compensation of the difference in revolution rates between the wheels during ABS in a turn is e.g. discussed in DE 42 01 675 C1 or DE 195 22 634 A1.

If, however, the turn radius changes during braking, e.g. if the driver changes the steering angle with the vehicle already in a turn, then the difference in revolution rates between the wheels is no longer compensated exactly. Above all, in the case of small brake slip during ABS control the percentage error arising from the differences in revolution rates can be very large.

SUMMARY OF THE INVENTION

An object of the present invention, on the other hand, is to develop a method of the above-mentioned type such that the wheel slip control can be carried out very accurately, especially if the turn radius changes while traversing a turn.

This object may be achieved according to the present invention by the features described herein.

The present invention is based on the idea that the data of sensors, such as e.g. steering angle sensors, speed sensors and yaw rate sensors, which are especially already present in the case of a vehicle dynamics control device, are used to determine the radius of the turn currently being traversed in relation to a selected point on the vehicle. The turn radius generally varies in the longitudinal direction of the vehicle, because the position of the center of rotation of the motion of the vehicle is located on the extension of the rear axle.

Taking into account the turn radius determined at the selected point and taking into account the wheelbase and track width, the radius of the turn being traversed can be calculated for each individual wheel. By comparing the wheel-related turn radii with each other, the speed component of each wheel caused by turning can be determined independently of any additional existing longitudinal slip in the form of braking slip or drive slip on the wheel involved. The influence of traversing a turn on wheel slip control can be eliminated in this way, thus advantageously raising the control quality of the wheel slip control.

For this purpose, a process is proposed with the method for operating a wheel slip control apparatus of a vehicle, including determining the wheel speeds of wheels of the vehicle compensated for wheel speed differences in a turn as input variables for the wheel slip control apparatus, wherein a) a neutral steering, understeering or oversteering driving condition of the vehicle is determined from the driving behavior of the vehicle while traversing the turn, b) depending on the determined neutral steering, understeering or oversteering driving condition of the vehicle, either the reference yaw rate or the actual yaw rate is used for calculation of a turn radius related to a selected point on the vehicle, c) wheel-specific turn radii for at least some of the wheels of the vehicle are determined from the turn radius related to the selected point, d) reference factors are determined from the wheel-related turn radii and a common reference turn radius is determined for at least some wheels of the vehicle, and e) the compensated wheel speeds are determined from the reference factors and measured wheel speeds for at least some wheels of the vehicle, and f) the compensated wheel speeds for at least some wheels of the vehicle are used as input variables for the wheel slip control apparatus.

The compensated wheel speeds determined in step e) are of essentially the same magnitude in the case of wheels with no braking slip or drive slip. If, by contrast, braking slip or drive slip occurs on one or more wheels, then the compensated wheel speeds of the wheels with braking slip or drive slip determined in step e) are different from the compensated wheel speeds characteristic of the wheels with no braking slip or drive slip, so that braking slip or drive slip control is activated on the wheels identified in this way, i.e. using the compensated wheel speeds.

The present invention therefore also relates to a wheel slip control apparatus, which is configured such that the wheel slip control is carried out on the basis of the compensated wheel speeds determined in accordance with the method according to the present invention. The control quality is very high in the case of such a wheel slip control apparatus, as the influence of the difference in revolution rates between the wheels in a turn has been eliminated for the compensated wheel speeds.

Because the sensor data, which ultimately result in the determination of the compensated wheel speeds, originates from sensors such as a steering angle sensor, a speed sensor and a yaw rate sensor, i.e. from sensors that are normally present in vehicle dynamics control devices, the method according to the present invention is most suitable to be carried out within the context of a vehicle dynamics control device. This is because no further sensors are necessary.

Alternatively, such sensors can of course also be additionally provided with a wheel slip control apparatus in the absence of vehicle dynamics control.

Advantageous developments and improvements of the present invention specified herein are possible by the measures further described herein.

The following particularly may be used for the calculation of the turn radius related to the selected point in step b) in the case of b1) the determined neutral steering driving condition of the vehicle; either the reference yaw rate or the actual yaw rate,
b2) the determined understeering driving condition of the vehicle; the actual yaw rate, and in the case of
b3) the determined oversteering driving condition of the vehicle; the reference yaw rate.

In the case of the neutral steering driving condition, the profile and the size of the two turn radii at the center of the rear axle, which are calculated based on the reference yaw rate and the actual yaw rate, are approximately identical. Therefore in this case either the reference yaw rate or the actual yaw rate can be used for the calculation of the turn radius related to the selected point.

In the case of oversteering or understeering vehicle behavior, one of the turn radii does not represent the radius of the turn actually being traversed, but a significantly smaller turn radius. In the case of understeering vehicle behavior, the turn radius calculated from the steering angle or the reference yaw rate is smaller than the radius of the turn actually being traversed, as the vehicle cannot carry out the demand determined by the steering angle. In the case of oversteering vehicle behavior, the measured yaw rate represents vehicle rotation that does not result from the radius of the turn being traversed, but from a skidding movement. Because only the longitudinal slip or the longitudinal speed at the respective wheel is relevant in the case of braking slip control, the lateral speed components caused by understeer or oversteer must be eliminated. This takes place by selecting from the two turn radii, which are calculated on the basis of the reference yaw rate and the actual yaw rate, the one that has the larger magnitude and thus represents the outer curve.

Thus the turn radius related to the selected point is calculated on the basis of the actual measured yaw rate in understeering driving conditions. In oversteering driving conditions, by contrast, the turn radius related to the selected point is calculated on the basis of the reference yaw rate, with which cornering is carried out up to the point of instability of the vehicle.

Furthermore, a central point disposed between the rear wheels of the vehicle on an axis of rotation of the rear wheels particularly may be used as the selected point on the vehicle to which the turn radius is related. Said selected point is e.g. the central point of the rear axle that is located on the rear axle.

According to a development, in the above step b) the turn radius related to the selected point is calculated as the ratio between the measured speed of the vehicle and the value for the yaw rate.

Furthermore, in the above step c) the wheel-related turn radii for at least some wheels of the vehicle may be determined from the turn radius related to the selected point and the wheelbase, as well as the track width of the vehicle.

Particularly, in the above step d) the common reference turn radius may be the turn radius related to the selected point, i.e. in this case the central point of the rear axle for example. A symmetrical and radius-independent speed profile of the compensated wheel speeds then results.

Furthermore, in the above step d) the reference factors may be determined from the ratio of the wheel-related turn radii and the common reference turn radius.

According to a development, in the above step e) the compensated wheel speeds are determined from the ratio of the measured wheel speeds and the associated reference factors.

As already mentioned above, the present invention also relates to a wheel slip control apparatus that is configured such that the wheel slip control is carried out on the basis of the compensated wheel speeds determined according to the method according to the present invention. Not least, the invention also relates to a vehicle dynamics control device comprising such a wheel slip control apparatus and a yaw rate detection device for detecting the actual yaw rate, and a steering angle sensor for detecting the steering angle that is used for the calculation of the reference yaw rate.

In particular, the vehicle dynamics control device is characterized by a controller in which a program for carrying out the above method is stored. In particular, values for the wheelbase and the track width of the vehicle are stored in said controller, using which and using the turn radius related to the selected point in the above step c), the wheel-related turn radii for at least some wheels of the vehicle are calculated.

The exact process of the method according to the present invention will be apparent from the following description of an exemplary embodiment.

BRIEF DESCRIPTION OF THE DRAWING

The FIGURE shows a schematic top view of the wheels of a vehicle in a turn.

DETAILED DESCRIPTION

The method according to the present invention is carried out during wheel slip control such as ABS (Anti-lock Braking System) or TCS (Traction Control System), which controls or limits braking slip and/or drive slip occurring on wheels of a vehicle to an optimal slip. The wheel slip control is integrated within a vehicle dynamics control arrangement such as ESP (Electronic Stability Program).

The steering angle δ from a steering angle sensor, an actual yaw rate $\omega_{z\_meas}$ from a yaw rate detection device, as well as the speed of the vehicle v from wheel speed sensors are available as sensor information to the controller of the vehicle dynamics control arrangement. Based on the steering angle δ and the speed of the vehicle v, a reference-yaw rate $\omega_{z\_ref}$, which represents a target yaw rate desired by the driver, is also calculated in the controller of the vehicle dynamics control arrangement.

Using the method described below, compensated wheel speeds may be calculated for all vehicle wheels, in which the influence of the differences in revolution rates of the vehicle wheels that are present because of turning is eliminated.

According to a first process step, a turn radius $R_{ra\_ref}$ or $R_{ra\_meas}$ related to a selected point on the vehicle, in this case e.g. related to the center of the rear axle, is calculated according to the relationship R=v/ω on the basis of the reference yaw rate $\omega_{z\_ref}$ and on the basis of the actual yaw rate $\omega_{z\_meas}$:

$$R_{ra\_ref} = v/\omega_{z\_ref}$$

$$R_{ra\_meas} = v/\omega_{z\_meas} \qquad (1)$$

In the case of stable driving or neutral steering while turning, the profile and the magnitude of both turn radii $R_{ra\_ref}$ and $R_{ra\_meas}$, in this case e.g. at the center of the rear axle, are approximately equal. In the case of oversteering or understeering vehicle behavior, a respective turn radius $R_{ra\_ref}$ or $R_{ra\_meas}$ does not represent the radius of the actually traversed turn but a significantly tighter turn radius.

In the case of oversteer, the vehicle is known to carry out a smaller turn radius than that which corresponds to the steering angle, and it carries out a larger turn radius in the case of understeer. Neutral steering means that the radius of the turn traversed approximately corresponds to the steering angle. Said driving conditions can be determined or distinguished using driving dynamic variables such as e.g. steering wheel angle, roll angle and float angle, which are acquired by suitable sensors.

In the case of understeering vehicle behavior, the turn radius $R_{ra\_ref}$ calculated from the steering angle $\delta$ or the reference yaw rate $\omega_{z\_ref}$ is smaller than the radius of the turn actually traversed, because the vehicle cannot follow the demand determined by the steering angle $\delta$. In the case of oversteering vehicle behavior, the measured yaw rate $\omega_{z\_meas}$ represents a vehicle rotation that does not result from the turn radius of the turn being traversed, but from a skidding motion.

Because only the respective longitudinal slip or the longitudinal speed at the respective wheel is relevant for braking slip control, the lateral speed components that are caused by understeer or oversteer must be eliminated. This is carried out by selecting from the two turn radii $R_{ra\_ref}$ and $R_{ra\_meas}$ the one that has the larger magnitude and thus represents the outer turn.

Thus in understeering driving conditions the turn radius $R_{ra\_meas}$ is calculated here, e.g. at the center of the rear axle on the basis of the actual measured yaw rate $\omega_{z\_meas}$. In oversteering driving conditions, by contrast, the turn radius $R_{ra\_ref}$ with which the turn is driven up to instability of the vehicle is calculated here, e.g. at the center of the rear axle on the basis of the reference yaw rate $\omega_{z\_ref}$. During stable driving or neutral steering, any turn radius $R_{ra\_meas}$ or $R_{ra\_ref}$ of the two turn radii can be used here, e.g. at the center of the rear axle.

The turn radii of the individual wheels of the vehicle are determined, in this case e.g. at the center of the rear axle, from the variables wheelbase l_wheelbase and track width b_track of the vehicle stored in the memory of the controller of the vehicle dynamics control arrangement according to another step based on the turn radius $R_{ra\_ref}$ or $R_{ra\_meas}$, which is determined depending on the driving condition (neutral steering, oversteer, understeer).

Based on the turn radius $R_{ra\_ref}$ or $R_{ra\_meas}$ determined as the turn radius $R_{ra}$ at the center of the rear axle according to Equation (1) depending on the driving condition (stable, oversteer, understeer), as the FIGURE shows a turn radius $R_{r(l/r)}$ results for the right wheel (r) and the left wheel (l) of the rear axle of the vehicle:

$$R_{r(l/r)} = R_{ra} \pm \tfrac{1}{2} b\_track \quad (2)$$

with:
$R_{r(l/r)}$=turn radius for the right wheel (r) and the left wheel (l) of the rear axle,
$R_{ra}$=turn radius at the center of the rear axle,
b_track=track width.

For the right wheel (r) and the left wheel (l) of the front axle (f) we get the turn radius $R_{f(l/r)}$:

$$R_{f(l/r)} = \sqrt{(R_{r(l/r)})^2 + l\_wheelbase^2} \quad (3)$$

with:
$R_{f(l/r)}$=turn radius for the right wheel (r) and the left wheel (l) of the front axle
$R_{r(l/r)}$=turn radius for the right wheel (r) and the left wheel (l) of the rear axle,
l_wheelbase=wheelbase.

The speed component of each wheel caused by turning can be determined from the comparison of said wheel-related turn radii $R_{f(l/r)}$ (front wheels) and $R_{r(l/r)}$ (rear wheels) with each other independently of any possible additionally existing braking slip on the wheel involved.

In order to establish comparability of the wheel speeds with each other adjusted for turning, the ratio of the wheel-related turn radii $R_{f(l/r)}$ (front wheels) and $R_{r(l/r)}$ (rear wheels) calculated according to Equation (2) or (3) to a common reference turn radius is shown as a reference factor kfl, kfr, krl, krr (see Equations (4) to (7) below). Said common reference turn radius is in principle freely selectable, but the central rear axle radius $R_{ra}$ is advisable because there is then a symmetrical and radius-independent speed profile of the compensated wheel speeds.

For the reference factors kfl, kfr, krl, krr as the ratio of the wheel-related turn radii $R_{f(l/r)}$ (front wheels) and $R_{r(l/r)}$ (rear wheels) to the common reference turn radius (central rear axle turn radius $R_{ra}$), the following applies:

$$kfl = \frac{R_{fl}}{R_{ra}} \quad (4)$$

$$kfr = \frac{R_{fr}}{R_{ra}} \quad (5)$$

$$krl = \frac{R_{rl}}{R_{ra}} \quad (6)$$

$$krr = \frac{R_{rr}}{R_{ra}} \quad (7)$$

Thus the wheel speed information e.g. of the left front wheel can be projected onto the center of the rear axle in order to obtain a wheel speed compensated with respect to the differences in revolution rates in a turn by dividing the measured wheel speed $v_{fl}$ of the left front wheel by the reference factor $k_{fl}$ associated with said wheel.

$$v_{fl\_}c = v_{fl}/k_{fl} \quad (8)$$

The compensated wheel speed $V_{fr\_}C$ on the right front wheel, $V_{rl\_}C$ on the left rear wheel and $V_{rr\_}C$ on the right rear wheel are calculated in a similar manner, i.e. according to Equation (8).

Because of the compensation of revolution rate differences caused by turning, the compensated wheel speeds $V_{fl\_}C$, $V_{fr\_}C$, $V_{rl\_}C$, $V_{rr\_}C$ determined in this way for all wheels not subject to braking slip or drive slip in a turn are essentially of the same magnitude.

If by contrast braking slip or drive slip occurs on one or more wheels, then the determined compensated wheel speeds $V_{fl\_}C$, $V_{fr\_}C$, $V_{rl\_}C$, $V_{rr\_}C$ of the wheels affected by braking slip or drive slip differ from the compensated wheel speeds characteristic of the wheels that are not affected by braking slip or drive slip, so that the braking slip control or drive slip control is activated on the wheels affected by braking slip or drive slip that are identified in this way, i.e. using the compensated wheel speeds $V_{fl\_}C$, $V_{fr\_}C$, $V_{rl\_}C$, $V_{rr\_}C$.

| LIST OF ABBREVIATIONS | |
|---|---|
| v | speed of the vehicle |
| $\omega_{\_ref}$ | reference yaw rate |
| $\omega_{z\_meas}$ | measured yaw rate |
| $R_{ra\_ref}$ | turn radius at the center of the rear axle, derived from reference yaw rate |

-continued

LIST OF ABBREVIATIONS

| | |
|---|---|
| $R_{ra\_meas}$ | turn radius at the center of the rear axle, derived from measured yaw rate |
| l_wheelbase | wheelbase |
| b_track | track width |
| $R_{ra}$ | turn radius at the center of the rear axle |
| $R_{rl}$ | turn radius at the left wheel rear |
| $R_{rr}$ | turn radius at the right rear wheel |
| $R_{fl}$ | turn radius at the front left wheel |
| $R_{fr}$ | turn radius at the front right |
| $V_{rl}$ | rear left wheel speed |
| $V_{rr}$ | rear right wheel speed |
| $V_{fl}$ | front left wheel speed |
| $V_{fr}$ | front right wheel speed |
| $V_{ra}$ | speed at the center of the rear axle |
| $V_{fa}$ | speed at the center of the front axle |
| kfl | reference factor for front left |
| kfr | reference factor for front right |
| krl | reference factor for rear left |
| krr | reference factor for rear right |
| $V_{fl\_C}$ | compensated front left wheel speed |
| $V_{fr\_C}$ | compensated front right wheel speed |
| $V_{rr\_C}$ | compensated rear right wheel speed |
| $V_{rl\_C}$ | compensated rear left wheel speed |
| ABS | Anti-lock Braking System |
| TCS | Traction Control System |
| ESP | Electronic Stability Program |

The invention claimed is:

1. A method for operating a wheel slip control apparatus of a vehicle, the method comprising:
   determining wheel speeds of wheels of the vehicle compensated with respect to wheel speed differences during a turn as input variables for the wheel slip control apparatus, with which the following are performed:
   a) neutral steering, understeering or oversteering driving condition of the vehicle is determined from a driving behavior of the vehicle during a turn;
   b) depending on the determined neutral steering, understeering or oversteering driving condition of the vehicle, either a reference yaw rate or an actual yaw rate is used for the calculation of a turn radius related to a selected point on the vehicle;
   c) wheel-related turn radii for at least some of the wheels of the vehicle are determined from the turn radius related to the selected point;
   d) reference factors are determined from the wheel-related turn radii and a common reference turn radius for at least some wheels of the vehicle;
   e) the compensated wheel speeds are each determined from the reference factors and measured wheel speeds for at least some wheels of the vehicle; and
   f) the compensated wheel speeds are used as input variables for a wheel slip control apparatus for at least some wheels of the vehicle.

2. The method of claim 1, wherein in b) in the case of:
   b1) a determined neutral steering driving condition of the vehicle, either the reference yaw rate or the actual yaw rate,
   b2) a determined understeering driving condition of the vehicle, the actual yaw rate,
   b3) a determined oversteering driving condition of the vehicle, the reference yaw rate is used for the calculation of the turn radius related to the selected point of the vehicle.

3. The method of claim 1, wherein a central point located between rear wheels of the vehicle on an axis of rotation of the rear wheels is used as the selected point on the vehicle to which the turn radius is related.

4. The method of claim 1, wherein the turn radius related to the selected point is calculated in b) as a ratio between the measured speed of the vehicle and the value used for the yaw rate.

5. The method of claim 1, wherein in c) wheel-related turn radii are determined for at least some wheels of the vehicle from the turn radius related to the selected point and a wheelbase, as well as a track width of the vehicle.

6. The method of claim 1, wherein in d) the common reference turn radius is the turn radius related to the selected point.

7. The method of claim 1, wherein the reference factors are determined in d) from a ratio of the wheel-related turn radii and the common reference turn radius.

8. The method of claim 1, wherein in e) the compensated wheel speeds are determined from a ratio of the measured wheel speeds and the associated reference factors.

9. A wheel slip control apparatus, comprising:
   a wheel slip control arrangement which uses compensated wheel speeds from determined wheel speeds of wheels of the vehicle which are compensated with respect to wheel speed differences during a turn as input variables for the wheel slip control apparatus, with which the following are performed:
   a) neutral steering, understeering or oversteering driving condition of the vehicle is determined from a driving behavior of the vehicle during a turn;
   b) depending on the determined neutral steering, understeering or oversteering driving condition of the vehicle, either a reference yaw rate or an actual yaw rate is used for the calculation of a turn radius related to a selected point on the vehicle;
   c) wheel-related turn radii for at least some of the wheels of the vehicle are determined from the turn radius related to the selected point;
   d) reference factors are determined from the wheel-related turn radii and a common reference turn radius for at least some wheels of the vehicle;
   e) the compensated wheel speeds are each determined from the reference factors and measured wheel speeds for at least some wheels of the vehicle; and
   f) the compensated wheel speeds are used as input variables for a wheel slip control apparatus for at least some wheels of the vehicle.

10. A vehicle dynamics control device, comprising:
    a wheel slip control arrangement which uses compensated wheel speeds from determined wheel speeds of wheels of the vehicle which are compensated with respect to wheel speed differences during a turn as input variables for the wheel slip control apparatus, with which the following are performed:
    a) neutral steering, understeering or oversteering driving condition of the vehicle is determined from a driving behavior of the vehicle during a turn;
    b) depending on the determined neutral steering, understeering or oversteering driving condition of the vehicle, either a reference yaw rate or an actual yaw rate is used for the calculation of a turn radius related to a selected point on the vehicle;
    c) wheel-related turn radii for at least some of the wheels of the vehicle are determined from the turn radius related to the selected point;
    d) reference factors are determined from the wheel-related turn radii and a common reference turn radius for at least some wheels of the vehicle;

e) the compensated wheel speeds are each determined from the reference factors and measured wheel speeds for at least some wheels of the vehicle;

f) the compensated wheel speeds are used as input variables for a wheel slip control apparatus for at least some wheels of the vehicle; and a yaw rate detection device for detecting the actual yaw rate.

11. The vehicle dynamics control device of claim 10, wherein values for a wheelbase and a track width of the vehicle are stored in a controller having a computer program for performing the tasks of the wheel slip control arrangement.

12. A vehicle dynamics control device, comprising:

a wheel slip control arrangement which uses compensated wheel speeds from determined wheel speeds of wheels of the vehicle which are compensated with respect to wheel speed differences during a turn as input variables for the wheel slip control apparatus, with which the following are performed:
   a) neutral steering, understeering or oversteering driving condition of the vehicle is determined from a driving behavior of the vehicle during a turn;
   b) depending on the determined neutral steering, understeering or oversteering driving condition of the vehicle, either a reference yaw rate or an the actual yaw rate is used for the calculation of a turn radius related to a selected point on the vehicle;
   c) wheel-related turn radii for at least some of the wheels of the vehicle are determined from the turn radius related to the selected point;
   d) reference factors are determined from the wheel-related turn radii and a common reference turn radius for at least some wheels of the vehicle;
   e) the compensated wheel speeds are each determined from the reference factors and measured wheel speeds for at least some wheels of the vehicle;
   f) the compensated wheel speeds are used as input variables for a wheel slip control apparatus for at least some wheels of the vehicle; and a steering angle sensor for detecting the steering angle that is used for the calculation of the reference yaw rate.

13. The vehicle dynamics control device of claim 12, wherein values for a wheelbase and a track width of the vehicle are stored in a controller having a computer program for performing the tasks of the wheel slip control arrangement.

* * * * *